Figure 2:
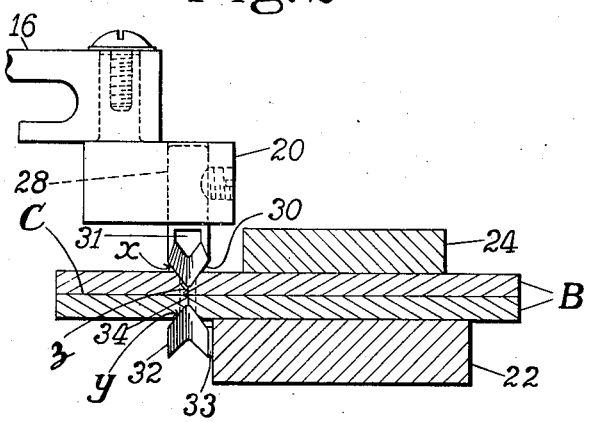

Oct. 24, 1944.   R. W. CUMMINGS   2,360,937
CUTTING TOOL
Original Filed Jan. 6, 1942

Patented Oct. 24, 1944

2,360,937

UNITED STATES PATENT OFFICE 2,360,937

CUTTING TOOL

Roy W. Cummings, Beverly, Mass., assignor to United Shoe Machinery Corporation, Flemington, N. J., a corporation of New Jersey Original application January 6, 1942, Serial No. 425,760. Divided and this application November 30, 1942, Serial No. 467,298

13 Claims. (Cl. 12—103)

This invention relates to tools for cutting various materials, it being especially directed to a knife for use in operating upon sheet-stock. A machine in which it may be employed usefully is that disclosed in the application for Letters Patent filed in my name in the United States Patent Office on January 6, 1942, and having the Serial No. 425,760. Of this application, the present case is a division. On July 20, 1943, the application matured into Patent No. 2,324,562.

In machines for performing such operations as the rounding of shoe-soles from sheets of leather or the like, a blank or blanks are clamped between opposite members, one of which furnishes a pattern, and a knife travels under the guidance of this pattern to cut the material to the corresponding form. The excess of blank-area over that of the finished piece produces a chip or waste-strip of differing widths. As the knife advances, it must free itself from this strip by forcing it outwardly. This produces a very considerable resistance to the cutting action, varying with the character and weight of the stock and with the degree of curvature of the pattern which guides the knife. In overcoming this resistance caused by the clearing of the chip, a substantial force other than that necessary to sever the blank must be applied. This may have the effect of displacing the work from the clamping means, or, if the stock is soft, may stretch it away from the pattern. In either case, the piece cut will not correspond in contour to that of the pattern. It is an object of my invention to eliminate largely the chip-resistance, and thus allow the cutter to follow the pattern accurately and to operate upon stock of increased thickness.

In the attainment of the above object, either in connection with the production of shoe-soles or the cutting of material for other purposes, I provide a tool having grooving blades spaced from each other to act at opposite sides of the work and a severing blade interposed between the grooving blades, such grooving blades preferably converging toward each other at their cutting edges and the severing blade having the opposite extremities of its cutting edge connecting the grooving blades at the rear of their cutting edges. The grooving blades gouge out from the material at opposite sides a considerable portion of its thickness with negligible lateral stresses, leaving but little material for the severing blade to divide, and through this said severing blade will pass readily without the necessity for applying much force to clear the chip which it forms. The improved tool is herein shown as a compound cutter, in which all the blades are integral. It may have a shank with a grooving blade carried by this shank, the severing blade extending from the grooving blade and the second grooving blade carried by the end of the severing blade opposite the shank. A guide-surface may be formed upon one of the blades, as the grooving blade farthest from the shank. This surface may determine by its contact with a pattern the relation of the tool to the work.

Figure 3:
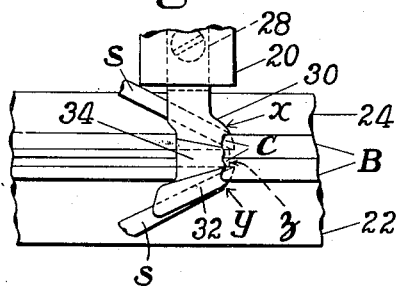
Figure 1:
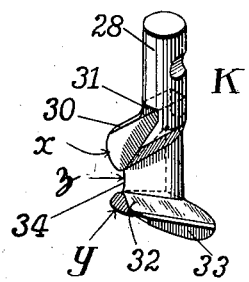

In the accompanying drawing illustrating the improved tool and one of its several possible applications, Fig. 1 shows said tool in perspective;

Fig. 2 is a front elevation of the tool in place upon the arm of a rounding machine; and Fig. 3, a partial side elevation corresponding to Fig. 2.

At 16 appears the end of the cutter-carrying arm of a sole-rounding machine, which may be of the well-known Planet type. Pivoted to turn upon the arm is a cutter-block 20. To the arm is imparted a movement of translation, which causes the cutter-block to advance a tool K which it carries about the periphery of a pattern 22. In its travel, the tool may divide from one or more blanks B, held in place upon the pattern by a clamp 24, a chip C of varying width, depending upon the difference in dimensions of the blank and the work-piece produced.

Considering now the tool K, it is, in effect, in its present utilization a compound drag-knife. It has projecting forwardly from a shank 28, by which it is fixed in the block 20, a grooving blade 30 downwardly inclined toward its cutting edge $x$. This blade may be transversely of V-shape, with its apex at the bottom. An opening 31 through the shank permits material removed from the work by the blade to be discharged freely. Below and opposite the blade 30, and converging forwardly and upwardly toward it to the cutting edge $y$, is a like blade 32. This blade is inverted, so the apices of the two blades are adjacent, and it is shown as carried by an interposed severing blade 34, which may be integral with the two grooving blades. The cutting edge $z$ of the blade 34 extends between the blades 30 and 32, just at the rear of their apices. From the blade 32 is a lateral extension 33, which furnishes a pattern-engaging surface for the tool K.

It will be seen that the blades 30 and 32 are so supported that they cut from opposite sides of the blanks, along planes substantially equally spaced from the vertical center, the line of operation following the contour of the finished sole.

Each of these blades produces in one side of the blank or stack of blanks B, a groove of considerable depth, the gouged-out strings s of the material being deflected upwardly from the blade 30, through the opening 31, and downwardly along the blade 32. The lateral resistance offered to the advance of the grooving blades is relatively slight, no chip being separated from the work in this direction as their cutting edges x and y act. After these opposite grooves have been cut, the intermediate blade 34 finds only a comparatively thin layer of material to sever by its cutting edge z, and, because of this, it is able to displace readily the chip C which is formed, even if this is of considerable width. Consequently, there is little tendency to shift the clamped blanks between their retaining members, and work of greater thickness may be cut accurately in a single operating cycle of the machine than has heretofore been possible. It is to be understood that this tool K may be employed for the production of a roughing cut in connection with a secondary tool making a finishing cut in a single machine, as in the parent application, or it may be used alone, as herein described, any departure from the desired contour being finished out in a succeeding operation.

Having described my invention, what I claim as new and desire to secure by Letters Patent of the United States is:

1. A cutting tool having grooving blades spaced from each other to act upon opposite sides of the work, and a severing blade interposed between the grooving blades.

2. A cutting tool having grooving blades situated opposite each other and converging toward their cutting edges, and a severing blade with the opposite extremities of its cutting edge connecting the grooving blades.

3. A cutting tool having spaced grooving blades converging toward their cutting edges, and a severing blade with the opposite extremities of its cutting edge connecting the grooving blades at the rear of their cutting edges.

4. A cutting tool for operation under the guidance of a pattern, said tool having spaced grooving blades, and a severing blade interposed between the grooving blades, one of the blades being provided with a surface arranged for contact with the pattern and by which the relation of the tool to the work is determined.

5. A compound cutter having opposite grooving blades, and an intermediate severing blade by which the grooved work is divided at the bottoms of the grooves, all these blades being integral.

6. A compound cutter having opposite grooving blades spaced from each other to act upon opposite sides of the work, and an intermediate severing blade, all these blades being integral and there being a guide-surface formed upon one of the grooving blades.

7. A compound cutter having opposite grooving blades each having plural cutting edges converging to an apex, an intermediate severing blade, and a shank projecting from one of the blades, the shank and blades being integral.

8. A cutting tool having a shank, a grooving blade carried by the shank, a severing blade extending from the grooving blade, and a second grooving blade carried by the end of the severing blade opposite the shank.

9. A cutting tool having a shank, a grooving blade carried by the shank, a severing blade extending from the grooving blade, and a second grooving blade carried by the severing blade, there being a guide-surface formed upon the grooving blade farthest from the shank.

10. A cutting tool having a shank, a grooving blade carried by the shank, a severing blade extending from the grooving blade, and a second grooving blade carried by the severing blade, the two grooving blades converging toward each other at their cutting edges.

11. A cutting tool having a shank, a grooving blade carried by the shank, there being an opening in said shank through which cut material may pass, a severing blade extending from the grooving blade, and a second grooving blade carried by the severing blade.

12. A tool for use in rounding machines, having a shank adapted to be clamped in a cutter-arm, a V-shaped grooving blade carried by the shank to act upon one side of the work, a severing blade extending from the grooving blade, and a second grooving blade carried by the severing blade to act upon the opposite side of the work from the companion grooving blade, the two grooving blades converging toward the apices of their cutting edges.

13. A tool for use in rounding machines, having a shank adapted to be clamped in a cutter-arm, a V-shaped grooving blade carried by the shank to act upon one side of the work, a severing blade extending from the grooving blade, and a second grooving blade carried by the severing blade to act upon the opposite side of the work from the companion grooving blade, the two grooving blades converging toward the apices of their cutting edges and the cutting edge of the severing blade being spaced rearwardly from those of the grooving blades.

ROY W. CUMMINGS.